United States Patent Office 3,732,183
Patented May 8, 1973

3,732,183
FILAMENT-FORMING SYNTHETIC LINEAR POLYESTERS MODIFIED BY SULFONATE GROUPS
Jurgen Popp, Kelkheim, Taunus, and Lieselotte Wappes, Frankfurt am Main, Germany, assignors to Farbwerke Hoechst Aktiengesellschaft vormals Meister Lucius & Bruning, Frankfurt am Main, Germany
No Drawing. Filed Sept. 9, 1971, Ser. No. 179,211
Claims priority, application Germany, Sept. 11, 1970, P 20 44 931.4
Int. Cl. C08g 17/08
U.S. Cl. 260—75 P    4 Claims

ABSTRACT OF THE DISCLOSURE

Filament-forming synthetic polyesters having a high molecular weight and comprising links in the chain of the polymer molecule which contain sulfonate groups. These chain links containing sulfonate groups have the general formulae

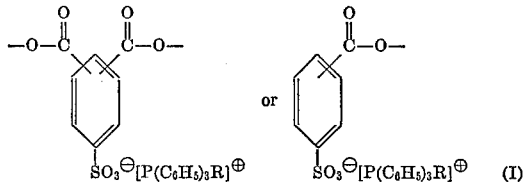

in which R stands for an alkyl radical, for example, $CH_3$, $C_2H_5$, n—$C_3H_7$, n—$C_4H_9$, or the 3-sodium (sulfopropyl) radical, or the 4-sodium (sulfo-butyl) radical and are contained in the polymer in an amount of from 0.5 to 5 mol percent, calculated on the polymer unit consisting of dicarboxylic acid radical and diol radical.

---

The present invention relates to filament-forming synthetic linear polyesters having a high molecular weight and comprising links in the chain of the polymer molecule which contain sulfonate groups.

The linear polyesters prepared in known manner on the basis of dicarboxylic acids or their ester-forming derivatives and diols, such as, for example, polyethylene terephthalate or the polyester of terephthalic acid and 1,4-dimethylol cyclohexane, have only a limited number of active terminal groups, and thus a minor affinity, in particular towards cationic dyestuffs. As has been known before, it is possible to increase the affinity towards those dyestuffs by incorporating monomer units in the polymer chain which carry anionic groups, such as the sulfonate or the phosphonate group. U.S. Patents Nos. 3,018,272; 3,164,566; 3,164,567; 3,164,570; 3,166,531; 3,184,434; 3,185,671; 3,138,180; and 3,301,819 describe sulfonate-containing monomers and copolyesters containing those monomers. In these polyesters, the sulfonate groups are in every case used in the form of their metal salts. The polyesters can, without exception, well be dyed with cationic dyestuffs, however, they have the disadvantage that their melt viscosities increase in an excessively strong manner, as compared against their solution viscosities.

It was therefore the objective of the invention to obtain filament-forming synthetic linear high molecular weight polyesters comprising links in the chain of the polymer molecule which contain sulfonate groups, which polyesters have a good affinity for cationic and dispersion dyestuffs, improved antistatic properties, and do not show increased melt viscosities along with high solution viscosities. They can be processed at the usual spinning temperatures and therefore show a considerably reduced degradation in the spinning process.

This objective was obtained in that the polyesters contain altogether from 0.5 to 5, preferably from 1 to 3 mol percent, calculated on the polymer unit consisting of a dicarboxylic acid radical and a diol radical, of at least one chain link of the general formulae

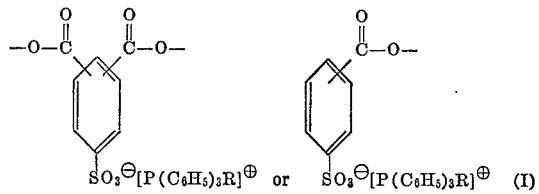

in which

R represents an alkyl radical, for example, $CH_3$, $C_2H_5$, n—$C_3H_7$, n—$C_4H_9$, or the 3-sodium (sulfo-propyl) radical, or the 4-sodium (sulfo-butyl) radical.

As starting material for the polyesters of the invention there are used terephthalic acid and/or its ester-forming derivatives and the common glycols of the formula $HO(CH_2)_mOH$, wherein $m$ represents a number of from 2 to 10, or 1,4-dimethylol cyclohexane. It goes without saying that copolyesters may also be modified in accordance with the invention, which contain, for example, up to 10 mol percent of a second di- or hydroxycarboxylic acid (adipic acid, sebacic acid, hexahydroterephthalic acid, isophthalic acid, naphthalene dicarboxylic acids, ε-hydroxycaproic acid, p-[β-hydroxyethoxy]-benzoic acid, etc.) and/or a second diol, which may be of the type mentioned above, or 2,2-dimethyl-propanediol-1,3, or another branched aliphatic diol.

Chain links containing sulfonate groups of the general formulae

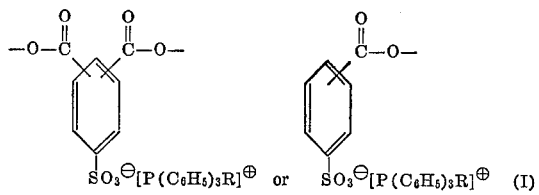

in which

R represents an alkyl radical, such as $CH_3$, $C_2H_5$, n—$C_3H_7$, n—$C_4H_9$, or the 3-sodium(sulfopropyl) radical, or the 4-sodium(sulfobutyl) radical, are incorporated in these known polyesters.

The amount of incorporated chain links is in the range of from 0.5 to 5, preferably from 1 to 3 mol percent, calculated on the polymer unit consisting of the dicarboxylic acid radical and the diol radical.

If less than 0.5 mol percent is used, only a minor dyeing capacity with cationic dyestuffs is observed. If the content of modifying component is above 5 mol percent, the melting point of the polyesters decreases relatively strongly, while the dyeing capacity does not increase any more to a considerable extent. The most favorable results are obtained with a content of from 1 to 3 mol percent of the chain link of the general Formula I.

The chain links of the general Formula I are generally incorporated in the polymer chain via two ester groups, however, they may also be contained in the polymer molecule as a terminal group, bound via only one ester group; both variations may also be present at the same time.

It was surprising and could not have been foreseen that the compounds used for the preparation of the polyesters of the invention, which compounds have the general formula

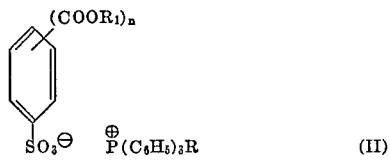

wherein

R represents an alkyl radical, such as $CH_3$, $C_2H_5$, n—$C_3H_7$, n—$C_4H_9$ or the 3-sodium(sulfopropyl) radical, or the 4-sodium(sulfobutyl) radical, and $R_1$ represents a methyl, ethyl, propyl or butyl radical, are stable at the condensation temperatures required for the preparation of the polyesters, for example, about 280° C. in the preparation of polyethylene terephthalate.

The polyesters of the invention are prepared according to known methods. The common dulling agents, for example, $TiO_2$, or stabilizers, for example, $H_3PO_4$, may be added.

The compounds of the general Formula II used for the modification have not been known so far. They are prepared according to the general formula schemes:

(a) for R=$CH_2$, $C_2H_5$, n-$C_3H_7$, n-$C_4H_9$

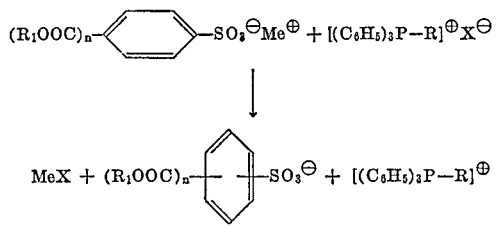

(b) for R=—$CH_2$—$CH_2$—$CH_2$—$SO_3Na$ or —$CH_2$—$CH_2$—$CH_2$—$CH_2$—$SO_3Na$

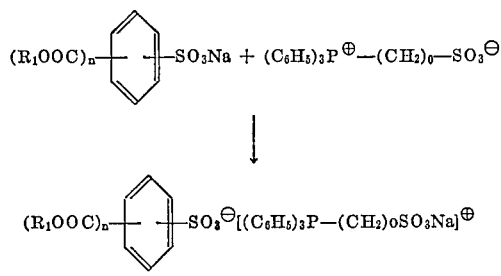

wherein

R represents an alkyl radical, such as $CH_3$, $C_2H_5$, n—$C_3H_7$, n—$C_4H_9$ or the 3-sodium(sulfopropyl) radical, or the 4-sodium(sulfobutyl) radical, and $R_1$ represents a methyl, ethyl, propyl, butyl radical, $n$ is 1 or 2, $o$ is 3 or 4, and X stands for $Cl^-$, $Br^-$, $J^-$, Me being a monovalent metal, preferably Na, K.

(c) In the case that in (a) R represents $CH_3$— or $C_2H_5$—, there is the possibility that X represents $CH_3$—O—$SO_3^\ominus$ or $C_2H_5OSO_3^\ominus$, whereas $R_1$ and $n$ have the meaning specified in (a) and (b).

Further details can be seen from Example A, 1 to 7 below.

The polyesters of the invention are distinguished by the fact that—in contradistinction to the known polyesters containing metal sulfonate groups—they do not show in increased melt viscosity with the same solution viscosity. This is why it is not necessary to increase the spinning temperature of these polyesters having a relative viscosity of more than 1.6 (measured by means of the system indicated below), which is advantageous for filament material. This has the advantage that the reduction of the molecular weight which becomes evident in the spinning process and which can be seen by a decrease of the relative viscosity, is considerably smaller.

The polyesters of the invention are extremely suitable for the manufacture of filaments, fibers and sheets or other shaped articles that can be dyed with cationic dyestuffs.

The following examples illustrate the invention.

In order to characterize the polyesters described in the examples, the differential thermo-analysis was applied. The relative viscosities $\eta_{rel.}$ indicated were determined in a solution of the polyester of 1% by weight in a mixture of phenol and tetrachlorethane in a weight ratio of 3:2 at a temperature of 25° C.

The melt viscosities were determined in a capillary viscosimeter, which was operated by means of gas pressure.

(A) PREPARATION OF THE COMONOMERS CONTAINING SULFONATE GROUPS OF FORMULA II

Example 1: Triphenyl-methyl-phosphonium-methyl sulfate 26.2 g. of triphenyl phosphine and 12.6 g. of dimethyl sulfate were heated carefully for several minutes on the water bath at 40° C. In the course of a strongly exothermic reaction, the triphenyl phosphine dissolved and a yellow oily liquid was obtained, which crystallized while cooling. The crystal mass was dissolved in 90 g. of methylene chloride, and the phosphonium salt was precipitated with 300 g. of ethyl acetate. After the reaction product had been filtered off with suction and dried, 35 g. of triphenyl-methyl-phosphonium-methyl sulfate (91% of the theory) having a melting point of from 145 to 147° C. were obtained.

Analysis.—Calculated for $C_{10}H_{21}O_4SP$: 61.9% of C; 5.4% of H; 8.0% of P; 8.22% of S. Found: 61.9, 62.1% of C; 5.8, 5.8% of H; 8.0, 7.9% of P; 7.9, 8.0% of S.

Example 2: Triphenyl-ethyl-phosphonium-ethyl sulfate 26.2 g. of triphenyl phosphine and 15.4 g. of diethyl sulfate were heated for 1 hour and 30 minutes on the steam bath at a temperature of 80° C. The oily yellow liquid obtained was dissolved in 65 g. of methylene chloride, and the phosphonium salt was precipitated with 240 g. of ethyl acetate. After the reaction product had been filtered off with suction and dried, 35 g. of triphenyl-ethyl-phosphonium-ethyl sulfate (85% of the theory) having a melting point of from 135 to 136° C. were obtained.

Analysis.—Calculated for $C_{22}H_{25}O_4SO$: 63.2% of C; 6.0% of H; 7.4% of P; 7.7% of S. Found: 63.9, 63.6% of C; 6.3, 6.2% of H; 7.4, 7.4% of P; 7.5, 7.7% of S.

Example 3: Triphenyl-etnyl-phosphonium-ethyl sulfate 67.5 g. of triphenyl phosphine, 40 g. of diethyl sulfate, and 100 g. of benzene were refluxed, while stirring. After one hour the precipitation of the phosphonium salt started. Subsequently, the reaction mixture was stirred for one hour at 80° C., was then cooled, and the precipitated crystal mass was filtered off with suction. After drying, 71 g. of triphenyl-ethyl-phosphonium-ethyl sulfate (70% of the theory) having a melting point of from 135 to 136° C. were obtained.

The triphenyl-alkyl-phosphonium-alkyl sulfates thus obtained were used for the preparation of modifying components of the general Formula II.

Example 4: Triphenyl-methyl-phosphonium-3,5-dicarbomethoxy-benzene sulfonate 59.2 g. of sodium-3,5-dicarbomethoxy-benzene sulfonate were dissolved in 600 ml. of hot water. 77.6 g. of triphenyl-methyl-phosphonium-methyl sulfate dissolved in 250 ml. of hot water were added to this solution, while stirring. The reaction mixture was brought to the boil, was then cooled, and the separated oil was eliminated in a separatory funnel. The aqueous phase was extracted twice with 100 ml. each of methylene chloride, and the extract was united with the oil which had been separated before. After 500 ml. of ethyl acetate had been added and after rubbing the phosphonium salt crystallized out. It was filtered off with strong suction and was then dried for 8 hours at a temperature of up to 100° C. and a pressure of 200 mm. of mercury, 96.8 g. (88% of the theory) of triphenyl - methyl - phosphonium - 3,5 - dicarbomethoxy-benzene sulfonate having a melting point of from 140 to 141° C. were obtained.

*Analysis.*—Calculated for $C_{29}H_{27}O_7PS$: 63.3% of C; 4.9% of H; 5.6% of P; 5.8% of S. Found: 62.8, 63.0% of C; 5.2, 5.3% of H; 5.4, 5.3% of P; 5.5, 5.6% of S.

Example 5: Triphenyl-ethyl-phosphonium-3,5-dicarbomethoxy-benzene sulfonate

According to the same method as described in Example 4, 29.6 g. of sodium-3,5-dicarbomethoxy-benzene sulfonate, dissolved in 300 ml. of water, were reacted with 41.6 g. of triphenyl-ethyl-phosphonium-ethyl sulfate dissolved in 200 ml. of water. The reaction mixture was brought to the boil, was then cooled, and the separating oil was brought to crystallization by rubbing. After the reaction product had been filtered off with suction, it was dried for 4 hours at a temperature of 50° C. and a pressure of 200 mm. of mercury, and for 4 hours at 85° C. and 200 mm. of mercury. 48 g. (87% of theory) of triphenyl-ethyl-phosphonium-3,5-dicarbomethoxy-benzene sulfonate were obtained, which, after dissolution in 30 ml. of methylene chloride and precipitation with 200 ml. of ethyl acetate and drying had a melting point of from 98 to 102° C.

*Analysis.*—Calculated for $C_{30}H_{29}O_7PS$: 64.0% of C; 5.1% of H; 5.5% of P; 5.7% of S. Found: 64.4, 64.2% of C; 5.4, 5.2% of H; 5.4, 5.5% of P; 5.3, 5.3% of S.

Example 6: Triphenyl-ethyl-phosphonium-3,5-dicarbomethoxy-benzene sulfonate

It was also possible to prepare the phosphonium salt described in Example 5 by reacting 59.2 g. of sodium-3,5-dicarbomethoxy-benzene sulfonate (dissolved in 500 ml. of water) with 74.2 g. of triphenyl-ethyl-phosphonium bromide in 400 ml. of water. After the solutions had been united, they were boiled for a short period of time, then cooled, and the precipitate was filtered off with suction. It was dried for 4 hours at 50° C., and for 4 hours at 85° C. and a pressure of 200 mm. of mercury; 105 g. (94% of the theory) of triphenyl-ethyl-phosphonium-3,5-dicarbomethoxy-benzene sulfonate having a melting point of from 99 to 102° C. were obtained.

Example 7: [3-sodium-sulfo-propyl]-triphenyl-phosphonium-3,5-dicarbomethoxy-benzene sulfonate 19.2 g. of 3-[triphenyl-phosphonium]-1-propane sulfonate were dissolved in 150 ml. of hot dimethyl formamide, with addition of 5 ml. of water. 14.8 g. of sodium-3,5-dicarbomethoxy-benzene sulfonate in 100 ml. of hot dimethyl formamide were added to this solution. The reaction mixture was brought to the boil, was cooled, and a large amount of ether was added. The white precipitate was filtered off with suction and was dried for 8 hours at 100° C. and a pressure of 200 mm. of mercury. 30 g. (88% of the theory) of [3-sodium-(sulfo-propyl)]-triphenyl-phosphonium-3,5 - dicarbomethoxy - benzene sulfonate having a melting point of from 236 to 240° C. were obtained.

*Analysis.*—Calculated for $C_{31}H_{30}O_{10}PS_2Na$: 54.7% of C; 4.41% of H; 4.55% of P; 9.42% of S. Found: 55.5, 55.1% of C; 4.7, 4.8% of H; 4.4, 4.4% of P· 9.7, 9.8% of S.

(B) PREPARATION OF THE POLYESTERS OF THE INVENTION AND OF THE FILAMENTS AND FIBERS MADE THEREOF

The test dyeings described in the following examples were performed within 90 minutes with a fiber-to-liquor ratio 1 to 50 at a temperature of from 98° C. to 100° C. The amount of dyestuff was 2% by weight, calculated on the fibers and filaments to be dyed.

As test dyestuffs there were used:

(1) Astrazon Red 6 B (Colour Index, Second Edition 1956, vol. I Basic Violet 7, page 1635, No. 48020)
(2) Astrazon Red RL (Colour Index, Second Edition 1956, Supplement 1963 Basic Red 25, page 162)
(3) Deorlene Brilliant Yellow 5 GL (Colour Index, Second Edition 1956, Supplement 1963, page 149 Basic Yellow 13)
(4) Basacryl Blue GL (Colour Index, Second Edition 1956, Supplement 1963, Basic Blue 54, page 175)
(5) Maxilon Blue RL (Colour Index, Second Edition 1956, Supplement 1963, Basic Blue 40, page 172).

Example 8

1,000 g. of dimethyl terephthalate, 812 g. of ethylene glycol, 60 g. of triphenyl-ethyl-phosphonium-3,5-dicarbomethoxy-benzene sulfonate, 0.21 g. of manganese acetate, and 0.306 g. of antimony trioxide were heated for 4 hours at a temperature in the range of from 175 to 230° C. in a stirring vessel provided with a column and a cooler, until the forming of methanol was completed.

In order to eliminate the excess glycol, the product obtained was heated in a polycondensation vessel for 30 minutes at first at a temperature of 250° C. Subsequently, the pressure was reduced within 60 minutes to 0.2 to 0.5 mm. of mercury, while maintaining the temperature. The polycondensation proceeding with a splitting-off of ethylene glycol was terminated by heating the reaction product to 275° C. under a pressure of from 0.2 to 0.5 mm. of mercury. The time required in order to obtain the final viscosity at a temperature of 275° C. and a pressure of from 0.2 to 0.5 mm. of mercury is termed polycondensation time.

In the present case after 2 hours and 30 minutes a condensation product was obtained which had a relative viscosity of 1.79, a second-order transition temperature of 76° C., a crystallization temperature of 121° C., and a melting point of 252° C. The melt viscosity at 285° C. was 1350 poise. The conversion points were determined by differential thermo-analysis. The sulfur content was 0.31% by weight, the phosphorus content was 0.28% by weight.

The product which had been dried for 2 hours at a temperature of 150° C. and a pressure of 10 mm. of mercury, could be spun in an extruder already at a temperature of 280° C. through a nozzle having 24 holes, with a drawing-off rate of 1,000 meters per minute. The filaments were drawn according to common processes in a ratio of 1 to 3.65 and were fixed at 110° C. They had the following properties:

| | |
|---|---|
| Total titer _____dtex__ | 59.1 |
| Tensile strength _____p./dtex__ | 4.0 |
| Elongation _____percent__ | 23.8 |
| Relative viscosity _____ | 1.715 |

Subsequently, 2.5 g. of the material were dyed, in which process intense dyeings were obtained. The dyed filaments were after-washed for 30 minutes at 50° C., with a solution of 5 g. of Marseille soap, i.e. a laundry soap made from olive oil, and 2 g. of soda in 1 liter of water. The dyeings were very fast to washing and showed a good light-fastness.

Example 9

1,000 g. of dimethyl terephthalate, 812 g. of ethylene glycol, 40 g. of triphenyl-ethyl-phosphonium-3,5-dicarbomethoxy-benzene sulfonate, 0.21 g. of manganese acetate, and 0.306 g. of antimony trioxide were transesterified for 5 hours at a temperature of from 175 to 225° C. and were then polycondensed.

The polyester obtained after a polycondensation time of 2 hours and 20 minutes had a relative viscosity of 1.83, a second-order transition temperature of 73° C., a crystallization temperature of 120° C., and a melting point of 251° C. The melt viscosity was 1510 poise.

The dried product was processed under the same conditions as have been specified in Example 1, however, it was processed at 285° C. into filaments which showed the following properties:

Total titer _____dtex__ 58.7
Tensile strength _____p./dtex__ 4.1
Elongation _____percent__ 22.6
Relative viscosity _____ 1.72

The filaments were dyed intense shades by test dyestuffs.

Example 10

1,000 g. of dimethyl terephthalate, 812 g. of ethylene glycol, and 0.21 g. of manganese acetate were transesterified for 5 hours at a temperature of from 180 to 225° C. After the transesterification had been completed, 58 g. of triphenylmethyl-phosphonium - 3,5-dicarbomethoxy-benzene sulfonate, dissolved in 70 g. of ethylene glycol, and 0.306 g. of Sb₂O₃ were added and the mixture was polycondensed. The polyester obtained after a polycondensation time of 2 hours had a relative viscosity of 1.79, a second-order transition temperature of 75° C., a crystallization temperature of 125° C., a melting point of 251° C., and a melt viscosity of 1310 poise. The product could well be sput and stretched. The filaments were dyed intense shades by test dyestuffs.

Example 11

500 g. of dimethyl terephthalate, 406 g. of ethylene glycol, 0.105 g. of manganese acetate, 17 g. of [3-sodium-(sulfo-propyl)]-triphenyl-phosphonium - 3,5 - dicarbomethoxy-benzene sulfonate, and 0.306 g. of Sb₂O₃ were transesterified for 5 hours at a temperature of from 175 to 230° C. and were subsequently polycondensed.

The polyester obtained after 1 hour and 30 minutes had a relative viscosity of 1.74, a second-order transition temperature of 78° C., a crystallization temperature of 126° C., a melting point of 251° C., and a melt viscosity of 2160 poise. The product was spun and drawn under the conditions specified in Example 8, however, at 285° C. It had the following properties:

Total titer _____dtex__ 57.9
Tensile strength _____p./dtex__ 4
Elongation _____percent__ 23.8
Relative viscosity _____ 1.630

The filaments obtained can be dyed intense shades with cationic dyestuffs.

In this example, the melt viscosity is higher than in the preceding examples, probably, because a SO₃Na group was present in the molecule, not only phosphonium cations.

Example 12

1,000 g. of dimethyl terephthalate, 1,000 ml. of 1,4-butanediol, and 0.89 g. of titanium tetraisopropylate were transesterified for 2 hours at a temperature of from 160 to 190° C. After the transesterification had been completed, 60 g. of triphenylethyl-phosphonium - 3,5 - dicarbomethoxy-benzene sulfonate dissolved in 100 ml. of ethylene glycol were added and the mixture was polycondensed for 1 hour and 30 minutes at a temperature in the range of from 230 to 240° C. A polycondensation product was obtained which had a relative viscosity of 2.18 and a melting point of 218° C. The product could well be spun and drawn. The filaments were dyed intense shades with test dyestuffs.

Example 13

1,000 g. of dimethyl terephthalate, 812 g. of ethylene glycol, 0.083 g. of zinc acetate, 0.033 g. of calcium acetate, and 0.56 g. of anhydrous sodium acetate were transesterified for 3 hours at a temperature in the range of from 175 to 200° C. After the transesterification had been completed, 0.058 g. of phosphorous acid, 0.306 g. of antimony trioxide, and 60 g. of triphenyl-ethyl-phosphonium-3,5-dicarbomethoxy-benzene sulfonate dissolved in 80 ml. of glycol were added and the mixture was polycondensed at a temperature of from 250 to 275° C. and a pressure of 0.2 mm. of mercury. The polyester obtained after a polycondensation time of 2 hours had a relative viscosity of 1.79, a second-order transition temperature of 79° C., a crystallization temperature of 125° C., a melting point of 255° C., and a melt viscosity of 1370 poise.

Comparative Example 14

In accordance with Example 1 of U.S. Pat. No. 3,018,272, 1,000 g. of dimethyl terephthalate, 704 g. of ethylene glycol, 32.7 g. of sodium-3,5-dicarbomethoxy-benzene sulfonate, and 1.37 g. of calcium acetate were transesterified and were subsequently polycondensed, while adding 0.306 g. of antimony trioxide. After a polycondensation time of 1 hour and 30 minutes at 275° C. and a pressure of 0.3 mm. of mercury, a polyester was obtained which had a relative viscosity of 1.721 and a melt viscosity of 7710 poise, a second-order transition temperature of 78° C., a crystallization temperature of 130° C., and a melting point of 246° C. Owing to its high melt viscosity, this polyester had to be spun at 290° C. In this process there was a degradation to a relative viscosity of 1.581.

Comparative Example 15

The reaction was carried out as has been described in Example 14, however, with a condensation time of 1 hour and 45 minutes. A polyester was obtained which had a relative viscosity of 1.843 and a melt viscosity of 16,400 poise. The spinning temperature had to be increased to 315° C. In this process there was a degradation to a relative viscosity of 1.547.

What is claimed is:

1. Filament-forming synthetic linear polyesters having a high molecular weight and comprising links in the chain of the polymer molecular which contain sulfonate groups, which polyesters contain altogether from 0.5 to 5 mol percent, calculated on the polymer unit consisting of dicarboxylic acid radical and diol radical, of at least one chain link of the formulae

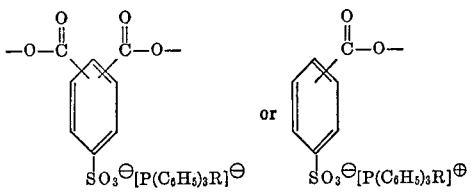

in which R represents an alkyl radical selected from the group consisting of $CH_3$, $C_2H_5$, n—$C_3H_7$, i—$C_3H_7$, n—$C_4H_9$, i—$C_4H_9$, or the 3-sodium(sulfo-propyl) radical, or the 4-solidium(sulfo-butyl) radical.

2. Filament-forming synthetic linear polyesters having a high molecular weight as clamied in claim 1, which polyesters contain from 1 to 3 mol percent, calculated on the polymer unit consisting of dicarboxylic acid radical and diol radical, of at least one chain link of the above formulae.

3. Filamentary material consisting of the polyesters claimed in claim 1.

4. Filament-forming synthetic linear polyesters having a high molecular weight and comprising links in the chain of the polymer molecule which contain sulfonate groups, which polyesters contain altogether from 0.5 to 5 mol percent, calculated on the polymer unit consisting of dicarboxylic acid radical and diol radical, of at least one chain link of the formula

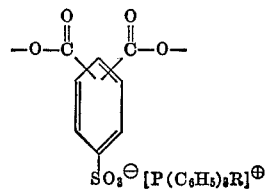

in which R represents an alkyl radical selected from the group consisting of $CH_3$, $C_2H_5$, n—$C_3H_7$, i—$C_3H_7$, n—$C_4H_9$, i—$C_4H_9$ (or the 3-sodium(sulfo-propyl) radical, or the 4-sodium(sulfo-butyl) radical.

References Cited
UNITED STATES PATENTS
3,639,352   2/1972   Katsura.

MELVIN GOLDSTEIN, Primary Examiner

U.S. Cl. X.R.

8—DIG. 4; 260—75 S